United States Patent

Schumann et al.

Patent Number: 6,142,196
Date of Patent: Nov. 7, 2000

[54] MACHINE FOR FORMING BOTTOM RAIL AND VALANCE OF WINDOW BLIND UNIT

[75] Inventors: Arthur I. Schumann, Marina Del Rey; Michael J. McCarty, Rancho Santa Margarita, both of Calif.

[73] Assignee: 3 Day Blinds, Inc., Anaheim, Calif.

[21] Appl. No.: 09/457,272

[22] Filed: Dec. 8, 1999

[51] Int. Cl.⁷ .............................. B27M 1/08; B27B 5/00
[52] U.S. Cl. .......................... 144/3.1; 29/24.5; 144/35.1; 144/5; 144/92; 144/93.1; 144/365; 144/367; 144/379; 408/34; 408/37; 408/40
[58] Field of Search ............................ 29/24.5, 702, 703, 29/711, 783, 791, 822, 33.1; 144/1.1, 3.1, 5, 35.1, 365, 367, 92, 93.1, 379; 408/31, 34, 36, 37, 40

[56] References Cited

U.S. PATENT DOCUMENTS

| | | | |
|---|---|---|---|
| 3,374,817 | 3/1968 | Anderson | 144/3.1 |
| 3,483,904 | 12/1969 | Jagumin | 144/3.1 |
| 4,736,511 | 4/1988 | Jenker | 144/35.1 |
| 4,823,449 | 4/1989 | Chang . | |
| 4,907,325 | 3/1990 | Hsu | 144/5 |
| 5,333,365 | 8/1994 | Marocco et al. . | |
| 5,349,730 | 9/1994 | Anderson et al. . | |
| 5,567,208 | 10/1996 | Larsson et al. . | |
| 5,720,087 | 2/1998 | Rasmussen . | |
| 5,799,557 | 9/1998 | Wang . | |
| 5,816,126 | 10/1998 | Pluber . | |
| 5,826,317 | 10/1998 | van Oostrom et al. . | |
| 5,890,521 | 4/1999 | Dunn | 144/1.1 |
| 6,003,218 | 12/1999 | Schumann et al. . | |

*Primary Examiner*—W. Donald Bray
*Attorney, Agent, or Firm*—Stetina Brunda Garred & Brucker

[57] ABSTRACT

A machine for forming a bottom rail and a valance for a window blind unit. The machine has a support member upon which a length of wood ultimately destined to be a bottom rail or a valance can reside while cutting occurs, and includes at least one laterally movable saw blade for cutting a selectable wood segment at a selectable angle up to 90°. Such angular cutting permits a mitred junction of corners in a formed valance. The machine also has at least one wood boring device and at least one wood drilling device to provide for pull cord anchoring whereby cords are passed through a drilled aperture and knotted such that the knot is housed in a bored compartment. The machine can be incorporated and automated for inline inclusion with automated components of a window blind manufacturing and assembly system to provide finished bottom rails and packaged valance components for final installation at a site of use.

12 Claims, 3 Drawing Sheets

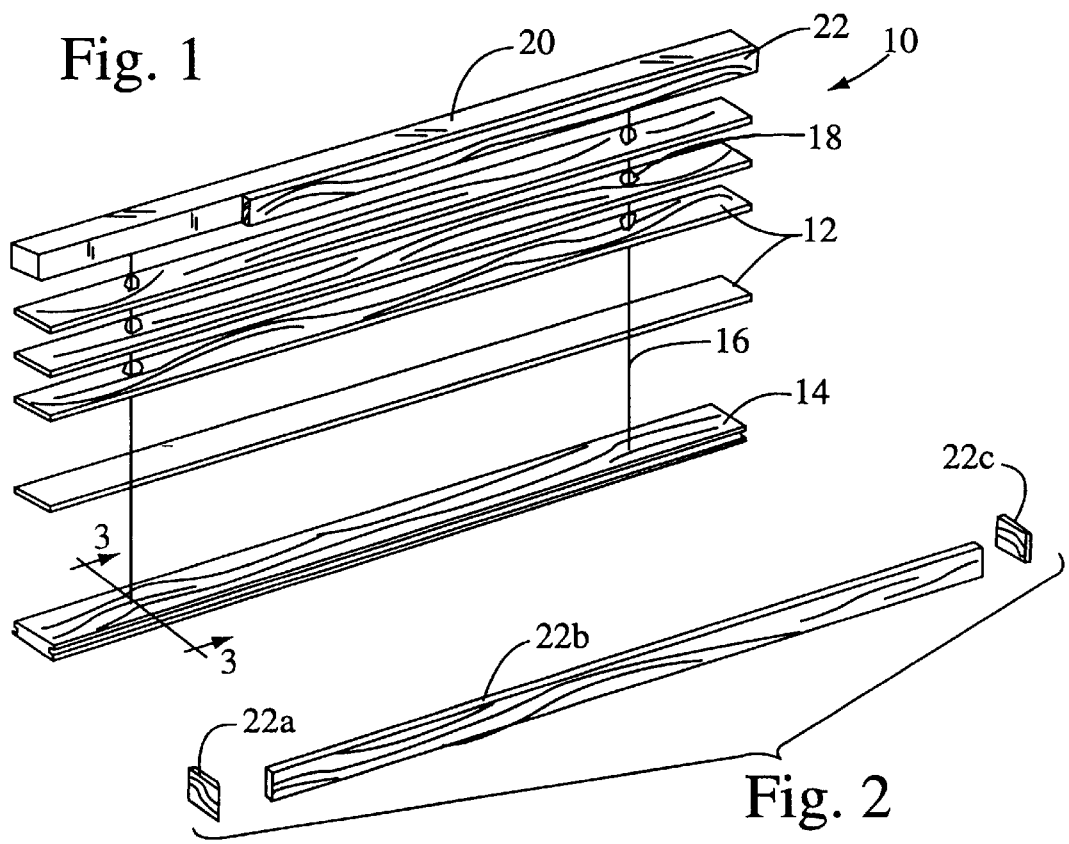
Fig. 1
Fig. 2
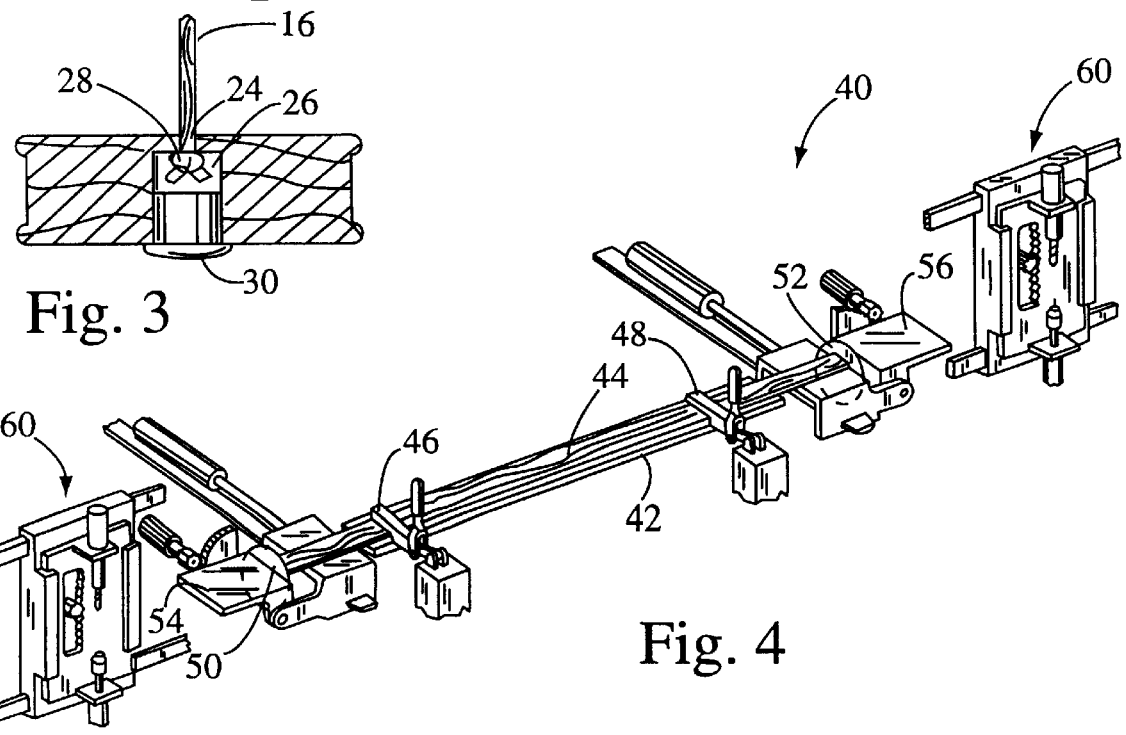
Fig. 3
Fig. 4

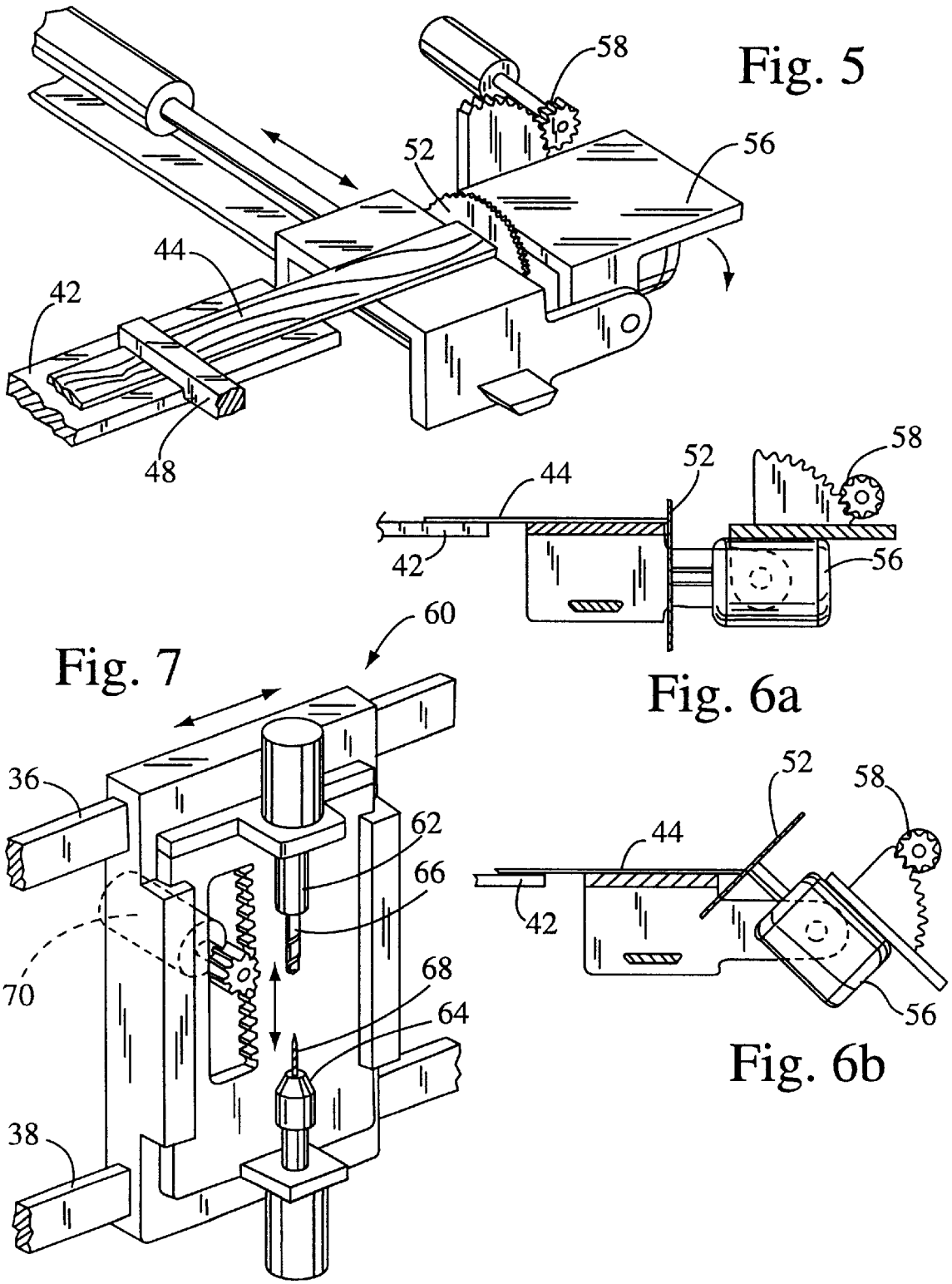

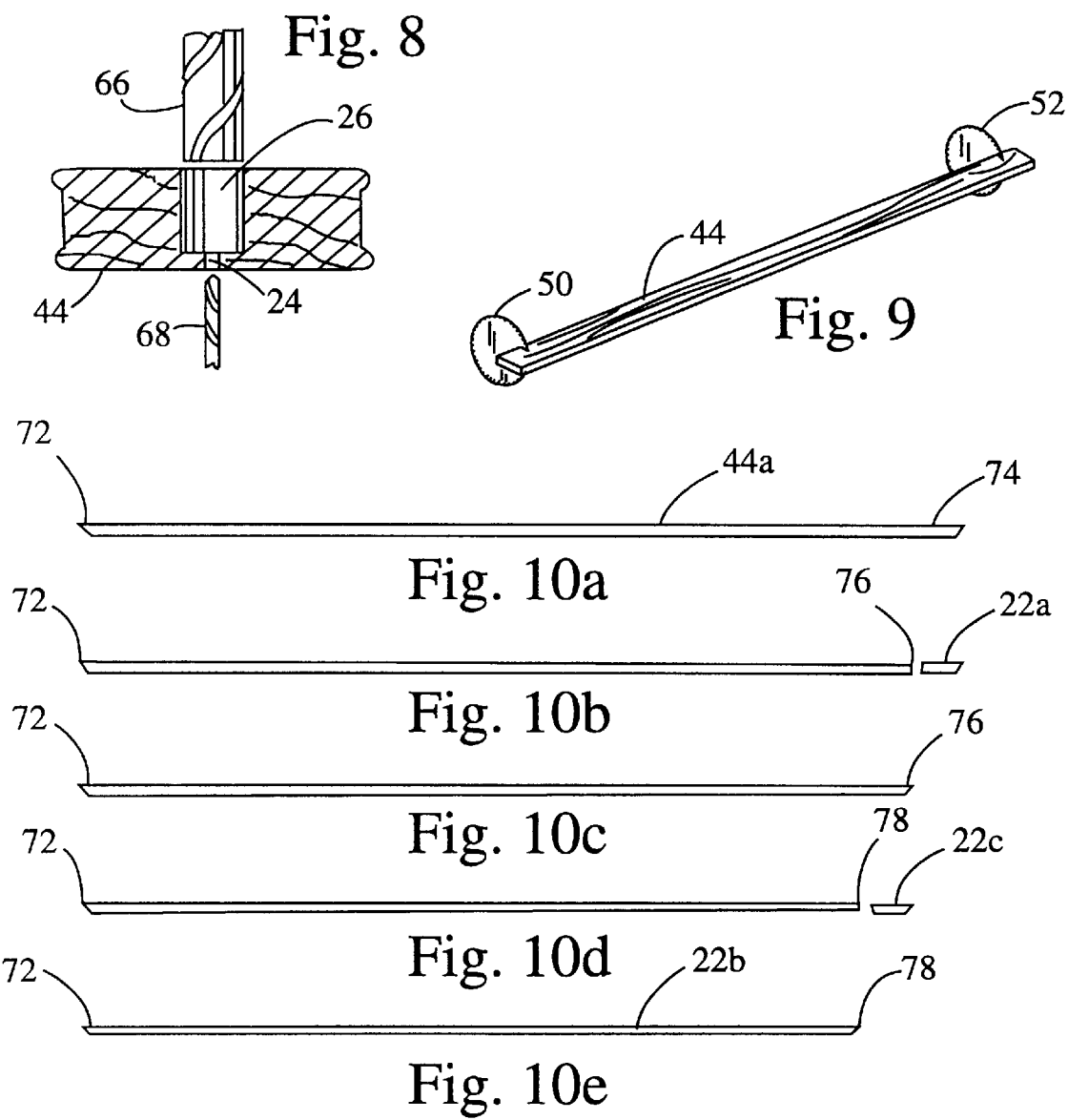

MACHINE FOR FORMING BOTTOM RAIL AND VALANCE OF WINDOW BLIND UNIT

FIELD OF THE INVENTION

This invention relates in general to the manufacture of window blind units, and in particular to a machine that forms both a bottom rail and a valance for a window blind unit wherein saw blades are operable both to cut, bore and drill the bottom rail for cord installation, and to straight-cut and angle-cut valance components from a single length of material such that resulting components are assemblable to cooperatively form a valance projecting from a mounting wall.

BACKGROUND OF THE INVENTION

Window blind units constructed of wooden slats effectively provide both aesthetic qualities and light-control utility for home or commercial installations. Such window blind unit construction includes a plurality of wooden slats vertically aligned with each other, with mechanisms for raising and lowering the blind units and arranging the angle of the slats.

In addition to having a plurality of slats, a window blind unit commonly has a bottom rail parallel with the last slat and into which spaced pull cords enter and are anchored. The bottom rail generally is thicker, and therefore heavier, than the slats to thereby provide weight and direction to the slats in maintaining the blind unit in place. The top of a window blind unit typically houses respective mechanisms for raising and lowering the slats and bottom rail and for adjusting the angle of the slats. Housing construction usually is a metal enclosure which, many times, is covered with a valance that blends with the style, color, etc. of the slats and bottom rail. If the blind unit is mounted within a window casing, the valance generally is of one piece construction and is the width of the slats and bottom rail. If the blind unit is mounted to extend laterally outside of the window casing, then the valance is provided with three panels (two lateral, one front) whose adjoining corners can be mitred to produce a meeting, non-overlapping joint. In that construction the two lateral panels protrude outwardly from the wall around the window casing while the front panel extends between the lateral panels as recognized in valance design.

As is apparent from the above description, the production of bottom rails and valances can be quite labor intensive. Such intensiveness is due in part at least to the fact that both the bottom rail and the valance must be prepared with adequate precision so that pull cords have properly placed openings in the bottom rail and that valance panels are properly angled at their meeting sites and correctly sized so that they can be effectively applied at the top of window blind units. Accordingly, a primary object of the present invention is to provide a machine for efficiently forming a bottom rail and a valance for a window blind unit.

Another object of the present invention is to provide such a machine wherein the bottom rail is cut to size and in which a bored portion and an accompanying drilled portion is provided for entry and anchoring of pull cords.

Yet another object of the present invention is to provide such a machine wherein valance components are cut to size and angled at appropriate lateral edges for generally precise meeting at perpendicular edges.

These and other objects of the present invention will become apparent throughout the description thereof which now follows.

SUMMARY OF THE INVENTION

The present invention is a machine for forming a bottom rail and a valance for a window blind unit. The machine comprises, first of all, a support member upon which a length of wood ultimately destined to be a bottom rail or a valance can reside while cutting of the wood occurs.

The machine additionally includes at least one saw blade which is laterally movable along the length of wood such that a selectable lateral segment of the length of wood can be cut away at a selectable angle up to 90°. When forming a bottom rail, or forming a valance for a window blind unit to be mounted within a window casing, the saw blade usually is set at 90° to thereby produce a perpendicular cut at the lateral edges which then line up with the lateral edges of the slats of the window blind unit. Conversely, when forming components of a valance to be mounted outside of the window casing and therefore project from the wall, three pieces of material are required such that two project from the wall and the third piece extends across the top of the window blind unit between the two projecting pieces The meeting sites of the edges of the two projecting pieces with the respective lateral edges of the third piece preferably produce a straight edge which is accomplished by providing a 45° angle to each adjacent edge. Thus, among the three valance pieces, both 90° and 45° edges are required and are provided by appropriate saw blade orientation.

As earlier noted, a bottom rail of a window blind unit generally provides for pull cord anchoring as pull cords pass from the top of the blind unit through apertures of each slat to thereby provide raising and lowering of the slats as well as their angular orientation for controlling light entry and/or privacy. To provide anchoring sites to a bottom rail, the present machine includes at least one wood boring device and at least one wood drilling device. Preferably, the two devices are united as a single unit. The drilling device provides the required number of apertures in the bottom rail for passage of the same number of individual draw cords, while the boring device provides bored compartments beneath respective cord apertures within which knots of respective cords can be housed to thereby anchor the cords to the bottom rail. After knot formation and placement within the bored compartments, plugs can be inserted into the compartment openings to thereby hide the knotted ends of the pull cords.

As is thus apparent, the present machine is capable of efficiently producing both bottom rails and valances for window blind units. The machine can be incorporated and automated for inline inclusion with automated components of a window blind manufacturing and assembly system to provide finished bottom rails and packaged valance components for final installation at a site of use.

BRIEF DESCRIPTION OF THE DRAWINGS

An illustrative and presently preferred embodiment of the invention is shown in the accompanying drawings in which:

FIG. 1 is a perspective view of a portion of a window blind unit;

FIG. 2 is a perspective view of components of a valance for a window blind unit;

FIG. 3 is a side elevation view in section of a bottom rail of a window blind unit along line 3—3 of FIG. 1;

FIG. 4 is a perspective view of operational components of a machine for forming a bottom rail and a valance for a window blind unit;

FIG. 5 is a perspective view of a saw blade component of the machine defined in FIG. 4;

FIG. 6a is a front elevation view in one position of the saw blade component of FIG. 5;

FIG. 6b is a front elevation view in another position of the saw blade component of FIG. 5;

FIG. 7 is a perspective view of a boring and drilling unit for forming bottom rail apertures and compartments;

FIG. 8 is a side elevation view in section of a bored and drilled bottom rail;

FIG. 9 is a perspective illustration of two opposing saw blades cutting lateral edges of a length of wood for use as a valance; and FIGS. 10a–10e are front elevation views of a length of wood for use in forming a valance.

DETAILED DESCRIPTION OF THE PREFERRED EMBODIMENT

As shown in FIG. 1, a typical window blind unit 10 includes a plurality of slats 12, a bottom rail 14, pull cords 16 extending through apertures 18 in the slats 12 and into the bottom rail 14, and a top housing 20 for respective mechanisms (not shown) in communication with the pull cords 16 used in raising and lowering the slats 12 and bottom rail 14 and for adjusting the angle of the slats. The top housing 20 usually is of metal construction and can be covered with a valance 22 partially shown in FIG. 1 as known in the art. FIG. 2 shows the components 22a, 22b, 22c, that form the valance 22. In particular, parallel components 22a, 22c extend outwardly from a wall site, while component 22b extends across the front. All components 22a, 22b, 22c preferably are adhered to respective walls of the top housing 20 as with double-coated tape as known in the art to thereby cover the housing 20. As easily recognized, the construction shown in FIGS. 1 and 2 relate to window blind units mounted outside a window casing. Where mounting occurs inside a window casing, only component 22b is employed since the remainder of the top housing 20 is within the housing.

FIG. 3 illustrates pull cord 16 anchoring within the bottom rail 14. Specifically, the bottom rail 14 has a drilled aperture 24 and a bored compartment 26 for each pull cord site. The pull cord 16 is passed through the aperture 24 and initially beyond the compartment 26 so that knotting can be accomplished. Thereafter, the pull cord 16 is pulled from above to place the knot 28 within the compartment 26, and a plug 30 is placed within the opening to the compartment 26 to complete the assembly.

FIGS. 4–9 illustrate the machine 40 for forming the bottom rail 16 and the valance 20 for a window blind unit 10. The machine 40 has a support member 42 upon which a length of wood 44 can reside during a cutting operation. Two conventional hand operable clamps 46, 48 are provided for releasably securing the length of wood 44 to the support member 42 which remains stationary during the entire operation. Conventionally constructed motor-driven opposing saw blades 50, 52 operate in a pathway from and to lateral sites of the support member 42 as indicated by the double arrow in FIG. 5 and are individually laterally movable for proper placement as needed. Respective saw-blade housings 54, 56 are angularly oriented via a conventional gear drive motor 58 to preferably provide either a 90° cut (FIG. 6a) or a 45° cut (FIG. 6b) to the length of wood 44. Of course, other angular cuts up to 90° are possible.

FIGS. 7 and 8 illustrate a laterally movable single bore-drill unit 60 having a boring device 62 and a drilling device 64 which are disposed opposite each other such that the length of wood can be placed there between for boring and drilling by the single unit 60. In particular, the boring device 62 has a bore bit 66 for forming the compartment 26 in the bottom rail 14, while the drilling device 64 has a drill bit 68 for forming the aperture 24. It is preferred that the bore procedure be performed before the drill procedure to ensure maintenance of structural stability of the bottom rail 14. As clearly illustrated in FIG. 7, the bore-drill unit 60 is laterally movable on support arms 36, 38, while both the boring device 62 and drilling device 64 are moved vertically with a conventional gear motor 70 to thereby establish contact with the length of wood 44.

FIG. 9 illustrates operation of the opposing saw blades 50, 52, while FIGS. 10a–10e show the sequential steps completed in the formation of a valance 20 made form a single length of wood 44. Specifically, FIG. 10a shows a length of wood 44a having each lateral edge 72, 74 thereof sawed to a 45° angle. FIG. 10b shows the next step in producing the valance 20 wherein the lateral edge 74 is cut at a 90° angle to form a new edge 76 and a valance piece 22a. In FIG. 10c, this new lateral edge 76 is cut to form a 45° angle, and the lateral edge 76 is cut at 90° to form another new edge 78 and a second valance piece 22c. Finally, in FIG. 10e, the new edge 78 is cut to form a 45° angle, and this remaining length of wood 44 becomes the front piece 22b of the valance 22 earlier described. A double coated adhesive tape (not shown) is applied to the back surface of each of the components 22, 22b, 22c for placement of the valance pieces 22a, 22b, 22c against the housing 20 with angular compliments of these valance pieces at adjoining corner edges. Thus, as described in the two immediately preceding paragraphs, the machine embodiment 40 of the present invention forms a bottom rail 14 and a valance 22 for use in finishing a window blind unit. Incorporated automation of the machine 40 inline with cooperating automated equipment for producing window blind units can be accomplished as would be recognized in the art. It is envisioned that such automation is accomplished through conventional communication with a microprocessor whose programmed capabilities mesh all manufacturing activities into sequential steps timed for optimum production.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A machine for forming a bottom rail and a valance for a window blind unit, the machine comprising:

a) a support member upon which a length of wood can reside during a cutting operation of said length of wood;

b) at least one saw blade movable laterally along the length of wood such that a selectable lateral segment of said length of wood can be cut away by said saw blade through a depth direction of the length of wood at a selectable angle up to 90°;

c) at least one wood boring device movable laterally along the length of wood such that bores can be formed at selectable bore sites in the length of wood; and d) at least one wood drilling device movable laterally along the length of wood such that apertures can be formed through the length of wood at bore sites.

2. A machine as claimed in claim 1 additionally having at least one clamp in communication with the support member for releasably securing the length of wood to said support member.

3. A machine as claimed in claim 1 wherein the selectable angle of the saw blade is between 45° and 90°.

4. A machine as claimed in claim 3 wherein two angles are selectable, said angles being 45° and 90°.

5. A machine as claimed in claim 1 wherein the boring device and the drilling device are a single unit wherein the two devices are disposed opposite each other such that the length of wood can be placed there between for boring and drilling.

6. A machine as claimed in claim 1 additionally having a programmable processor for programmed operation of the machine.

7. A machine for forming a bottom rail and a valance for a window blind unit, the machine comprising:
  a) a support member upon which a length of wood can reside during a cutting operation of said length of wood;
  b) two laterally opposing saw blades movable laterally toward and away from each other along the length of wood such that individual selectable lateral segments of said length of wood can be cut away by said saw blades through a depth direction of the length of wood at individually selectable angles up to 90°;
  c) two laterally opposing wood boring devices movable laterally toward and away from each other along the length of wood such that bores can be formed at selectable bore sites in the length of wood; and
  d) two laterally opposing wood drilling devices movable laterally toward and away from each other along the length of wood such that an aperture can be formed through the length of wood at bore sites.

8. A machine as claimed in claim 7 additionally having at least one clamp in communication with the support member for releasably securing the length of wood to said support member.

9. A machine as claimed in claim 7 wherein the individually selectable angles of the saw blades are between 45° and 90°.

10. A machine as claimed in claim 9 wherein two angles are selectable, said angles being 45° and 90°.

11. A machine as claimed in claim 7 wherein the boring devices and the drilling devices are respective single units wherein the respective two devices of each unit are disposed opposite each other such that the length of wood can be placed there between for boring and drilling.

12. A machine as claimed in claim 7 additionally having a programmable processor for programmed operation of the machine.

* * * * *